United States Patent [19]

Imura et al.

[11] Patent Number: 4,929,971
[45] Date of Patent: May 29, 1990

[54] CAMERA AND IMAGE OUTPUT APPARATUS CAPABLE OF TRIMMED PHOTOGRAPHING

[75] Inventors: Yoshio Imura, Machida; Tsugio Takahashi, Tokyo, both of Japan

[73] Assignee: Nikon Corporation, Tokyo, Japan

[21] Appl. No.: 360,245

[22] Filed: Jun. 1, 1989

[30] Foreign Application Priority Data

Jun. 3, 1988 [JP] Japan ................ 63-136754

[51] Int. Cl.[5] ............................ G03B 17/24
[52] U.S. Cl. ........................ 354/75; 354/106; 354/221; 354/400; 355/40; 358/909
[58] Field of Search ............ 364/75, 106, 221, 400; 355/40; 358/909

[56] References Cited

U.S. PATENT DOCUMENTS 4,478,493 10/1984 Yokota ..................... 354/221 X
4,780,735 10/1988 Taniguchi et al. ............ 354/202

*Primary Examiner*—Michael L. Gellner
*Attorney, Agent, or Firm*—Shapiro and Shapiro

[57] ABSTRACT

A camera and an image output apparatus is capable of trimmed photographing. The camera is provided with detection means for detecting parallax information for specifying the difference between the photographing field and the viewing finder field based on the positional relationship between the photographing lens and the viewing finder, focal length of the photographing lens and object distance; and recording means for recording the parallax information detected by the detection means.

The image output apparatus is provided with detection means for detecting the parallax information attached to the image information obtained in the above-mentioned camera; and means for printing or reproducing, on a cathode ray tube, the photographed image with trimming, corresponding to the finder viewing frame, according to the parallax information detected by the detection means.

10 Claims, 11 Drawing Sheets

CAMERA AND IMAGE OUTPUT APPARATUS CAPABLE OF TRIMMED PHOTOGRAPHING

BACKGROUND OF THE INVENTION

1. Field of the Invention

The present invention relates to a camera and an image output apparatus for printing or reproducing the image information photographed with said camera, capable of image trimming.

2. Related Background Art

In the view finders of conventional cameras, except those of single-lens reflex cameras, there is always a difference between the field viewed through the finder and the actually photographed, field, particularly when the distance to the object is short.

This phenomenon is due to a fact that the optical axis of the photographing optical system is distant from that of the finder optical system.

More specifically, in ordinary camera as shown in FIG. 18, the angle $\alpha$ of photographing of a photographing lens 102 of the camera 101 is selected substantially equal to the viewing angle $\beta$ of a finder optical system 103, but the actually photographed field 108 is different from the field 107 seen through the field as shown in FIG. 19, particularly when the distance to the object is short, so that the hatched area is not photographed though it is seen in the view finder.

In order to compensate the above mentioned parallax resulting from the positional separation between the optical axis of the photographing optical system and that of the finder optical system, there have been proposed following methods:

1. To form, in the viewing field frame of the finder, a viewing field correction mark for short distance; or
2. To move the viewing field frame of the finder toward the photographing lens as the distance to the object becomes shorter.

However, in the former method, it is very difficult, even for a considerably skilled photographer, to achieve exact parallax correction, in the photographing at a short distance, by determining the photographing frame with the correction mark.

Also the second method is not practical as the mechanism for moving the viewing field frame is complex and requires precision, and is therefore costly.

SUMMARY OF THE INVENTION

The object of the present invention is to provide a camera and an image output apparatus capable of trimmed photographing, not requiring the parallax correction at the photographing but providing an appropriate image with parallax correction by the trimming at the printing operation.

In order to achieve the above-mentioned object, the camera of the present invention capable of trimmed photographing is provided with detection means for detecting parallax information for specifying the difference between the photographing field and the viewing finder field based on the positional relationship between the photographing lens and the viewing finder, focal length of said photographing lens and object distance; and recording means for recording the parallax information detected by said detection means.

In case of a silver halide-based photographic film, the parallax information is recorded, either optically outside the photographing frame of said film, or on a recording medium provided on the film cartridge.

Also in case of an electronic still camera utilizing a magnetic disk as the recording medium, the parallax information is recorded on said magnetic disk, together with the photographed image information.

In case of an electronic still camera utilizing a semiconductor memory as the recording medium, the parallax information is recorded in said semiconductor memory, together with the photographed image information.

On the other hand, the image output apparatus is provided with detection means for detecting the parallax information attached to the image information obtained in the above-mentioned camera; and means for printing or reproducing, on a cathode ray tube, the photographed image with trimming, corresponding to the finder viewing frame, according to the parallax information detected by said detection means.

The parallax information used for the trimming corresponding to the finder viewing field is obtained, in case of the silver halide-based photographic film, from the information optically recorded outside the photographing frame, or from the recording medium provided on the cartridge used for loading said film.

Also in case of the electronic still camera, the parallax information corresponding to the image information to be reproduced is obtained from the magnetic disk or the semiconductor memory.

At the reading of the photographed image information from the magnetic disk or semiconductor memory and the reproduction thereof on the cathode ray tube, the image of the viewing finder field is displayed with trimming according to the detected parallax information.

In the camera and the image output apparatus, capable of trimmed photographing, of the above-explained structure, the parallax correction is not conducted in the view finder at the photographing operation. At said operation, there is detected and recorded the parallax information determined from the positional relationship between the photographing lens and the finder, focal length of said lens and object distance, and the parallax correction is made at the image reproduction, by trimming, from the photographed information, a field actually seen through the view finder based on the parallax information recorded corresponding to said photographed information.

DESCRIPTION OF THE PREFERRED EMBODIMENTS

Figure 1:
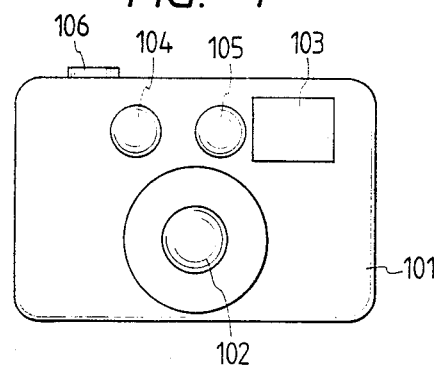
FIG. 1 is an elevation view of a camera of the present invention.

FIG. 1 is a schematic view of a camera utilizing a silver halide-based photographic film and capable of trimmed photographing, constituting an embodiment of the present invention, seen from the front.

Referring to FIG. 1, the camera 101 is provided with a photographing lens 102, and a view finder 103 in the upper right direction of said lens 102. There are further shown range-finding windows 104, 105 for measuring the distance to the object, and a shutter release button 106.

Figure 2:
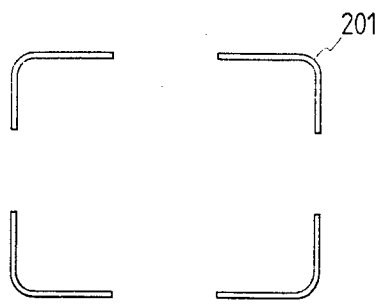
FIG. 2 is a schematic view of a view finder frame of the camera shown in FIG. 1.

In said view finder 103, there is incorporated a viewing field frame 201, as shown in FIG. 2, for determining the field to be photographed.

Figure 3A:
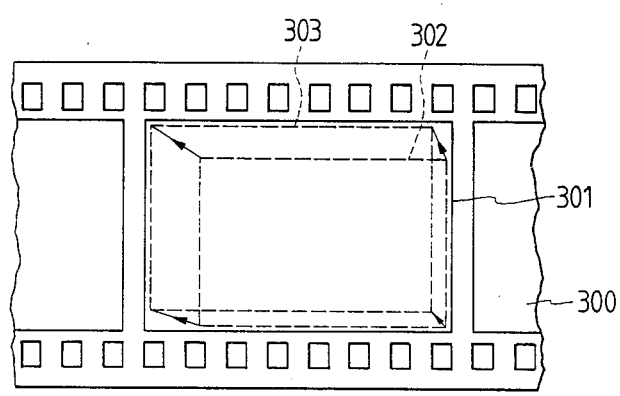
FIGS. 3A, 3B and 3C are schematic views showing the relationship between the field of the view finder and the actually photographed field on the film at different object distances in the camera shown in FIG. 1.

The photographing angle of the lens 102 is so selected that a photographed field 301 on a film 301, as shown in FIG. 3A, covers both a field 302 of the view finder at a long object distance and a field 303 of the view finder at a short object distance. Naturally the field of the view finder 103 may be selected narrower in comparison with the photographed field 301 on the film 300.

In the view finder 103 shown in FIG. 1, the viewing field frame 201 is fixed as shown in FIG. 2. In the camera of the present invention, the parallax correction is made with said viewing field frame 201 at the short object distance.

Figure 3B:
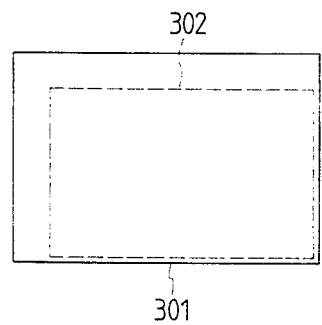
Figure 3C:
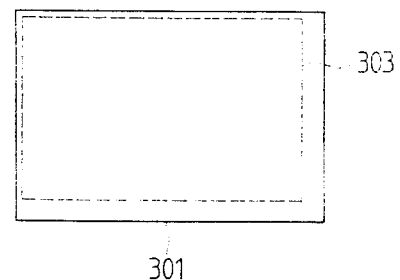

The fixed frame 201 of the view finder 103 shown in FIG. 2 provides viewing fields, at long and short object distances, as shown in FIGS. 3A, 3B and 3C.

Within the photographed area 301 of the film 300 shown in FIG. 3A, said view finder provides a viewing field 302 shown in FIG. 3B at the long object distance, or a viewing field 303 shown in FIG. 3C at the short object distance. Therefore, when the object distance is varied for example from a long distance to a short one, the viewing field of the finder moves in the photographed area 301, from the field 302 to 303 as indicated by arrows in FIG. 3A.

In the camera of the present invention utilizing a photographic film, therefore, there is detected and recorded the parallax information for specifying the difference between the photographed field 301 and the view finder field at each object distance, based on the positional relationship of the photographing lens 102 and the view finder 103, focal length of said lens 102 and object distance.

Figure 4:
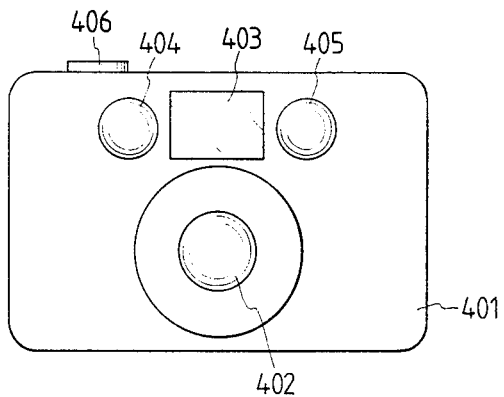
FIG. 4 is a schematic view of a camera constituting another embodiment of the present invention.

FIG. 4 is a schematic front view of another embodiment of the camera of the present invention, wherein a camera 401 is provided, as in the embodiment shown in FIG. 1, with a photographing lens 402, a view finder 403, range-finding windows 404, 405 for measuring the distance to the object, and a shutter release button 406. Different from the foregoing embodiment, the view finder 403 is positioned vertically above the photographing lens 402.

Figure 5:
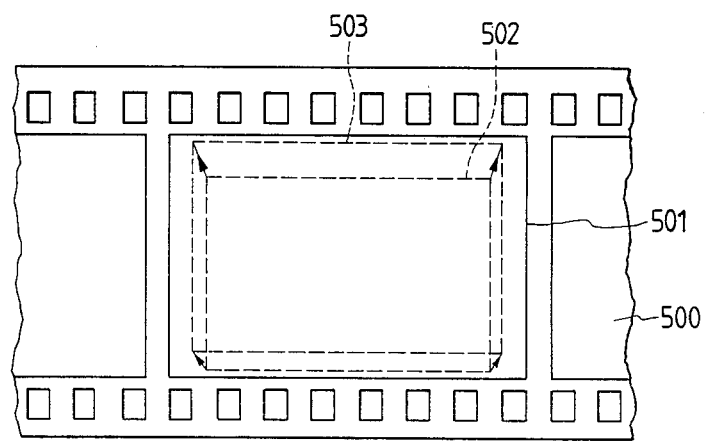
FIG. 5 is a schematic view showing the relationship between the field of the view finder and the actually photographed field on the film at different object distances in the camera shown in FIG. 4.

In case of the camera 401 shown in FIG. 4, within a photographed field 501 on a film 500 shown in FIG. 5, the view finder provides a viewing field 502 for a long object distance or a viewing field 503 for a short object distance.

Figure 6:
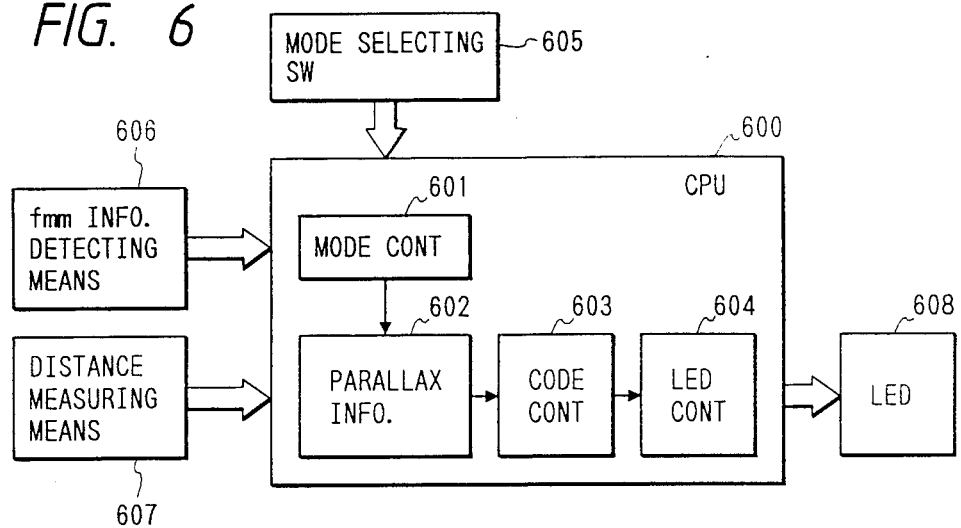
FIG. 6 is a block diagram of an embodiment of the camera of the present invention.

Now reference is made to FIG. 6 for explaining the structure of the camera shown in FIGS. 1 and 4.

A central processing unit (CPU) 600 for controlling various units of the camera is provided with a mode controller 601, a parallax information processor 602, a code converter 603 and an LED controller 604. The CPU 600 is provided with a mode selection switch 605 for enabling the photographer to select either a normal mode in which the parallax information is not recorded, or a trimming mode in which said information is recorded. The CPU 600 also receives detection output signals from focal length detecting means 606 for detecting the information from on the focal length of the photographing lens, and distance measuring means 607 for measuring the distance to the object. The parallax information detected by the CPU 600 is given to LED's 608 of a data recording unit, for optical recording of said parallax information in a predetermined position outside the photographing frame of the photographic film.

In the following there will be explained the function of the embodiment shown in FIG. 6, with reference to a flow chart shown in FIG. 7.

When a shutter release switch is closed in a step S1 by the depression of the shutter release button of the camera, a step S2 detects the distance to the object by the distance measuring means 607, and the information on the detected object distance is supplied to the CPU 600. The object distance can be obtained, in case of an automatic focusing camera, from distance measuring means provided therein, or, in case of a manual focusing camera, by detecting the amount of lens movement in the focusing operation and calculating the object distance from said amount.

After the distance measurement in the step S2, a step S3 discriminates whether the trimming mode has been selected. If the trimming mode has been selected with the mode selecting switch 605, the sequence proceeds to a step S4 for reading the focal length information of the photographing lens from the focal length detecting means 606, and a step S5 then reads the object distance information from the distance measuring means 607.

Then, in a succeeding step S6, the CPU 600 reads, through the parallax information processor 602, parallax correcting information stored in advance in a memory, such as a ROM table, and determines the trimming amount and the parallax correction amount, respectively indicating the amount and direction of correction, based on said parallax correction information.

An example of the ROM table for the parallax correction data, to be employed in said step S6, is shown in the following table.

In said table, the focal length f of the photographing lens and the object distance R are respectively divided into three ranges, and parallax correction data corresponding to each divided range are recorded as 4-bit signal.

TABLE

| R(m)<br>f(mm) | $1 \leq R < 2$ | $2 \leq R < 4$ | $4 \leq R \leq \infty$ |
|---|---|---|---|
| $35 \leq f < 45$ | 0001 | 0010 | 0011 |
| $45 \leq f < 58$ | 0101 | 0110 | 0111 |
| $58 \leq f < 70$ | 1001 | 1010 | 1011 |

The direction of parallax correction is determined by the positional relationship between the photographing lens 102 or 402 and the view finder window 103 or 403 in FIGS. 1 or 4. The direction and amount of parallax correction can be treated with the central coordinate at the trimming.

Figure 7:
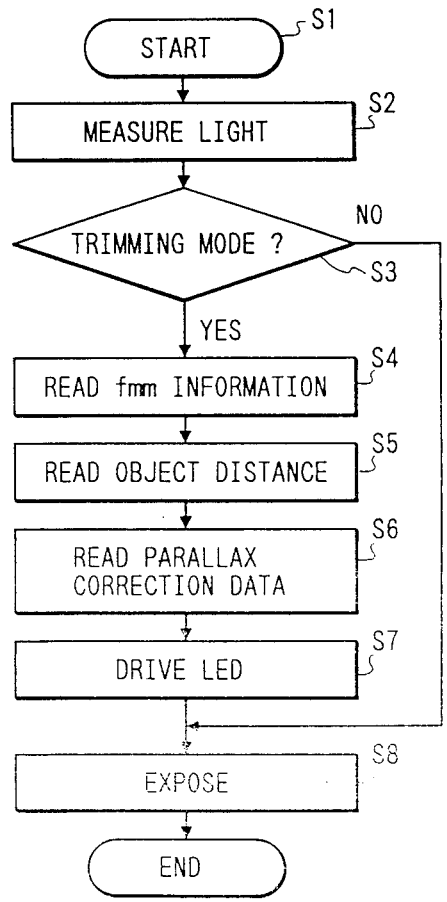
FIG. 7 is a flow chart of a control sequence for photographing operation in the embodiment shown in FIG. 6.

The parallax correction data read from the ROM table as shown in said table, according to the focal length f and the object distance R, are encoded as a trimming code by the code converter 603 of the CPU 600, and are used for activating the LED's 608 of the data recording unit through the LED controller 604 as shown in a step S7 of FIG. 7, thereby optically recording said trimming code in a position outside the photographing frame of the film.

Upon completion of the recording of the trimming code in the step S7, the CPU 600 activates the shutter in a step S8, thereby exposing the film to the object image.

The recording of the trimming code by the LED's 608 of the data recording unit may be conducted immediately before or after the exposure in the step S8.

The recording of trimming code in the steps S4 to S7 is not conducted if the normal photographing mode is identified in the step S3.

The above-cited table is applicable to a camera in which the lens has a variable focal length or is interchangeable. However, if the camera is provided with a photographing lens with a fixed focal length, the division by the focal length f is unnecessary and the amount of trimming and the amount of parallax correction can be determined solely according to the object distance R.

Figure 8:
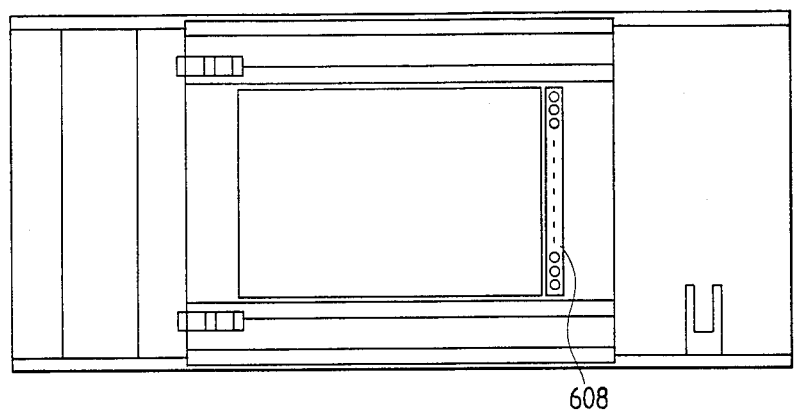
FIGS. 8 and 9 are views of LED's provided in the camera shown in FIG. 6, for recording the parallax information on the film.
Figure 9:
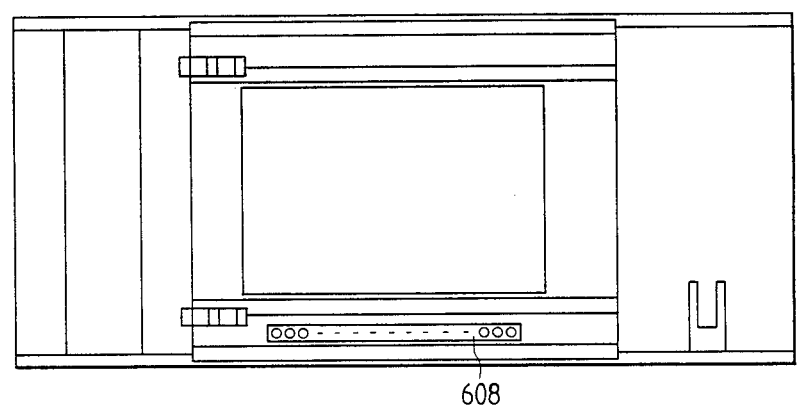

FIGS. 8 and 9 are rear views of the camera, with the rear cover thereof being open, for showing embodiments for optical recording of the parallax information or the trimming code obtained in the CPU 600, in a position outside the photographing area of the film. A related technology is disclosed in the U.S. Pat. No. 4,780,735.

In FIGS. 8 and 9, plural LED's 608 for data recording are activated to record the encoded parallax information on the photographic film.

The LED's 608 shown in FIG. 8 are arranged in a direction perpendicular to the advancing direction of the film, and record the parallax information in a space between neighboring frames of the film. The LED's 608 in FIG. 9 are arranged parallel to said advancing direction, and record the parallax information in a space between the perforations of the film and the lateral edge thereof.

In the structures shown in FIGS. 8 and 9, the data recording LED's 608 are positioned facing the photosensitive surface of the film, but they may also be positioned at the film pressure plate provided on the rear cover of the camera.

In the following there will be explained another embodiment in which the present invention is applied to a camera capable of providing pseudo telescopic effect by trimming.

Figure 10:
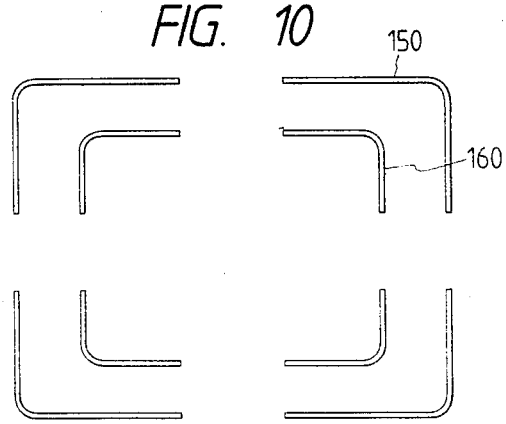
FIG. 10 is a schematic view of a view finder frame of a camera capable of providing pseudo telescopic effect.

FIG. 10 shows an example of the viewing field frame incorporated in the view finder of the camera capable of providing pseudo telescopic effect by trimming.

In FIG. 10 there are shown a frame 150 for ordinary photographing, corresponding for example to wide angle photographing, and a frame 160 for trimmed photographing, corresponding for example to telephotographing.

In the normal photographing, the influence of parallax is small because of the wide photographing angle. On the other hand, in the trimmed photographing with telescopic effect, the influence of parallax is large because of the smaller photographing angle.

It is therefore possible, in the photographing with trimming, to set the trimming mode as in the embodiment shown in FIG. 6 for recording the parallax information on the film and to effect the parallax correction at the printing operation by reproducing the field seen by the viewing field frame 160 for the trimmed photographing based on the parallax information. Since the film always photographs a field corresponding to the frame 150 for normal photographing even in the trimmed photographing, the parallax correction by the trimming with the frame 160 is sufficiently possible. The parallax correction by the trimming in the printing operation can be made to a shorter object distance, by recording the parallax information at the trimmed photographing, as the difference in photographing angle between the normal photographing and the trimmed photographing becomes larger.

If the recording area corresponding to the frame 150 for normal photographing is selected for example 85% of the entire recording area of the film, the parallax correction is also possible in the normal photographing by recording the parallax information on the film and effecting the image trimming at the printing operation based on the recorded parallax information, but a larger parallax correction is possible in the trimmed photographing mode, and the photographing at a shorter object distance is possible in the trimmed photographing mode than in the normal photographing mode.

In the trimmed photographing mode, there may be provided a short distance warning, that the parallax correction is not possible, at a short object distance where the parallax correction is no longer possible, and said short object distance is different from that in the normal photographing mode.

In the following there will be explained the printing apparatus of the present invention, for producing prints from the film used for photographing in the aforementioned camera and bearing the parallax information.

FIGS. 11A, 11B, 11C, 11D, 11E and 12 illustrate the procedure from the photographing in the trimming mode for recording the parallax information with the above-explained camera.

Figure 11A:
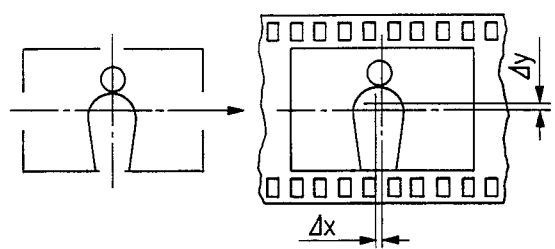
FIGS. 11A and 11B are schematic views explaining the recording of parallax information.
Figure 11B:
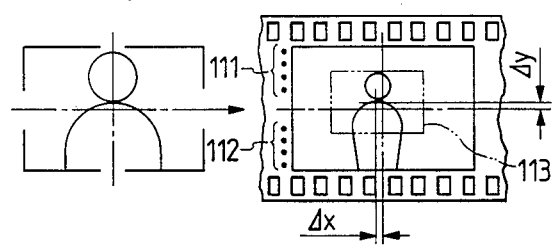

FIG. 11A(a) shows the image in the viewing field of the view finder in the normal photographing, and FIG. 11B(a) shows that in the photographing with trimming.

The films photographed in these states are respectively shown in FIGS. 11A(b) and 11B(b).

The film photographed in the trimming mode, shown in FIG. 11B(b) bears the trimming code, consisting of parallax correction information 111 and trimming information 112, recorded for example with the LED's 608 shown in FIG. 8. An area defined by double-dot chain lines indicates the viewing field of the view finder at the photographing in the trimming mode.

Figure 12:
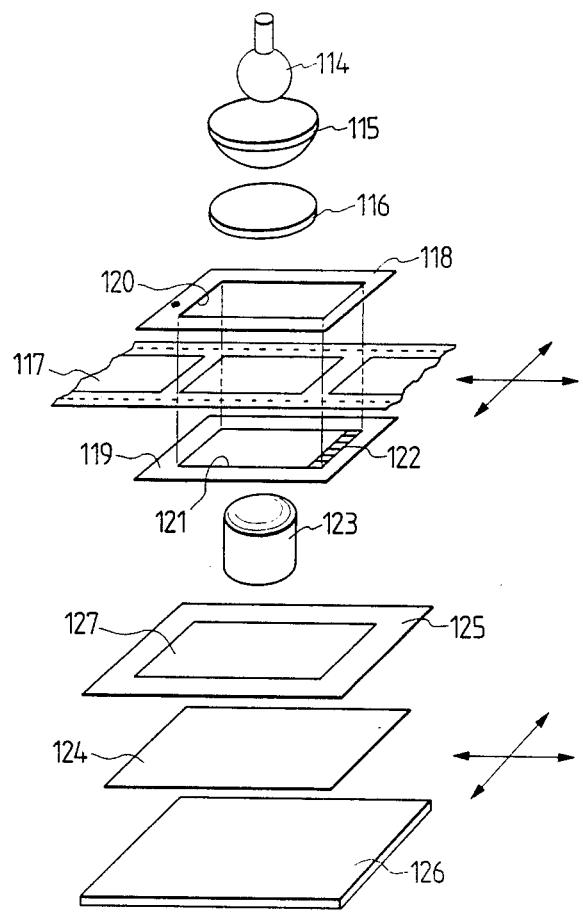
FIG. 12 is a schematic view of an apparatus for printing according to the parallax information.

FIG. 12 is a schematic view of a film enlarging apparatus. Light emitted from a lamp 114 illuminates, through condenser lenses 115, 116, a negative film 117 fixed between film carriers 118, 119. Said film carrier 118 is provided with an aperture 120 for illuminating the trimming code, consisting of the parallax information 111 and the trimming information 112 on the negative film 117 as shown in FIG. 11B(b), with the light from the lamp 114.

The lower film carrier 119 is provided with an aperture 121 which substantially corresponds to the photographed area of the film 117 and is provided, in the vicinity of the aperture 121, with an array 122 of plural photosensors. Said photosensor array 122 is positioned corresponding to the aforementioned LED's 608, wherein said LED's respectively correspond in position to said photosensors in the array 122.

Thus the portions exposed to the light of the LED's do not transmit the light from the lamp 114 while the portions not exposed to said light from the LED's transmit the light from the lamp 114, whereby the photosensor array 122 generates output signals corresponding to the pattern of said light transmission. In this manner the trimming code (parallax correction information 111 and trimming information 112) recorded on the negative film 117 can be read optically.

Naturally said trimming code has to be standardized between the camera and the processing laboratory effecting the printing operation.

The light from the lamp 114, transmitted by the negative film 117, reaches a photographic paper 124 through a lens 123, whereby the image recorded on said negative film 117 is printed on the photographic paper 124, which is supported between easels 125, 126. The upper easel 125 is provided with an aperture 127.

In the following there will be explained the enlarging procedure with the apparatus shown in FIG. 12.

At first the negative film 117 is set in the illustrated manner, and the trimming code is read by turning on the lamp 114.

A film photographed in the normal mode does not bear the trimming code, so that the light from the lamp 114 reaches all the photosensors of the array 122. If a signal "1" is generated when the light is received, said array generates signals "1", indicating the normal photographing mode.

If the film is identified to have been exposed in the normal photographing mode, the printing exposure can be made in ordinary manner. Thus the lamp 114 is turned off, then the photographic paper 124 is set in the easels 125, 126 and the exposure is made.

On the other hand, if the film photographed in the trimming mode is set on the enlarging apparatus, the trimming code is read by the photosensor array 122 when the lamp 114 is turned on, and the enlarging apparatus enters the trimming mode in response to said trimming code. In said trimming mode, the enlarging magnification is adjusted according to the trimming information 112 (FIG. 11B(b)) obtained from said trimming code, and the easels 125, 126 are simultaneously moved according to the parallax correction information 111 (FIG. 11B(b)) thereby effecting the parallax correction. Instead of the easels 125, 126, there may be moved the film carriers 118, 119 according to said parallax correction information 111.

Then the lamp 114 is turned off, the photographic paper 124 is set between the easels 125, 126 set in the parallax correction state, and the exposure is given by the lamp 114.

Figure 11C:
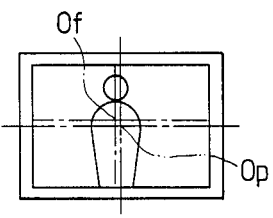
FIGS. 11C, 11D and 11E are schematic views showing prints obtained according to the parallax information.
Figure 11D:
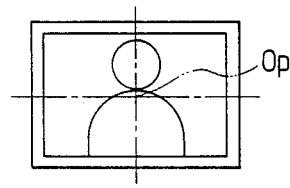

FIG. 11C shows the photograph of normal mode printed by the apparatus shown in FIG. 12, and FIG. 11D shows the photograph of trimming mode.

In the photograph of normal mode shown in FIG. 11C, the center Of of the view finder field is aberrated from the center Op of photographing field by the parallax, but the amount of said aberration is negligibly small in the wide angle lens employed in the normal mode photographing. However, even in such normal photographing, it is also possible to record the parallax information and to achieve complete parallax correction by trimming the right end and the lower end of the frame.

In the photograph of the trimming mode shown in FIG. 11D, the center Of of the view finder field coincides with the center Op of photographing field, because of the parallax correction.

Figure 11E:
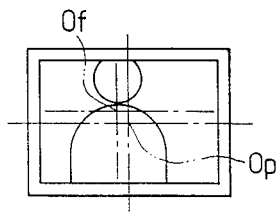

FIG. 11E shows a photograph which photographed in the trimming mode but printed without parallax correction, in which the object is not positioned in the center and is partially cut off.

It is now assumed, as shown in FIG. 11B(b), that the center Op of the photographing field and the center Of of view finder field are mutually aberrated, on the film, by $\Delta x$ in the lateral direction and $\Delta y$ in the vertical direction. Said amounts $\Delta x$, $\Delta y$ of aberration are same in the normal mode and in the trimming mode, since a same photographing lens is used. In the trimming mode, however, because the printed area is smaller, said amounts of aberration become larger in relative manner to provide a photograph as shown in FIG. 11E. The aberration between the center Op and Of becomes more marked as the object distance becomes shorter.

However, according to the present invention, there can be obtained a photograph in which the center Op of photographing field coincides completely with the center Of of view finder field, by recording the parallax information at the photographing and effecting the trimming by reading the parallax information at the enlarging operation.

In the apparatus shown in FIG. 12, the lamp 144 is turned on at first to read the trimming code thereby regulating the image magnification and the easel position, then the lamp 114 is turned off and the photographic paper is set for exposure. However it is also possible to provide a shutter in the vicinity of the lens 123 and to effect the exposure by the function of said shutter while the lamp 114 is kept turned on.

Figure 13:
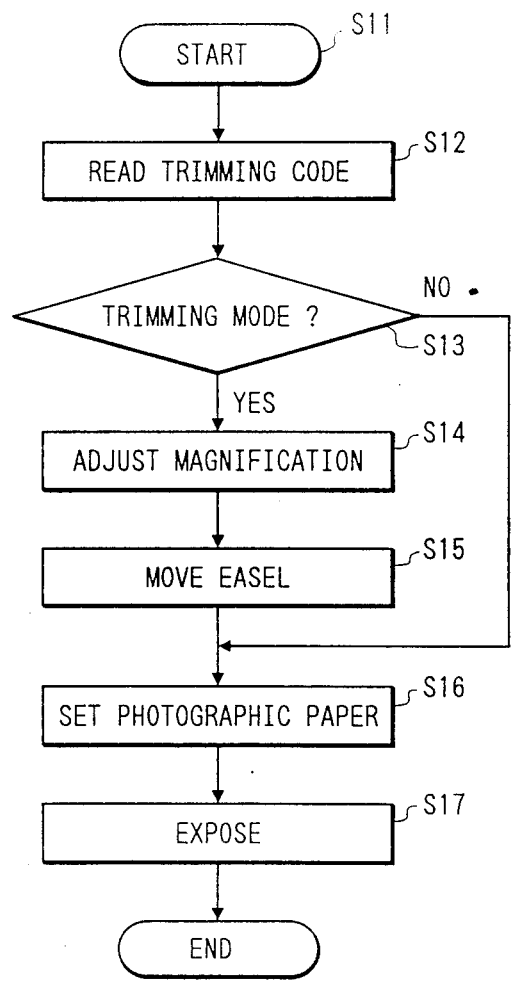
FIG. 13 is a flow chart of a control sequence for image enlargement.

FIG. 13 is a flow chart showing the enlarging procedure with the apparatus shown in FIG. 12. After the film is set in a step S11, the lamp is turned on and the trimming code of the film is read in a step S12, and a step S13 discriminates, from said trimming code, whether the trimming mode is selected. If selected, the sequence proceeds to a step S14 to regulate the enlarging magnification. Then a step S15 effect the movement of the easels, and, in the turned-off state of the lamp, the photographic paper is set in a step S16, and the exposure is conducted in a final step S17. The steps S14 and S15 are not executed if the normal mode is identified in the step S13.

Figure 14:
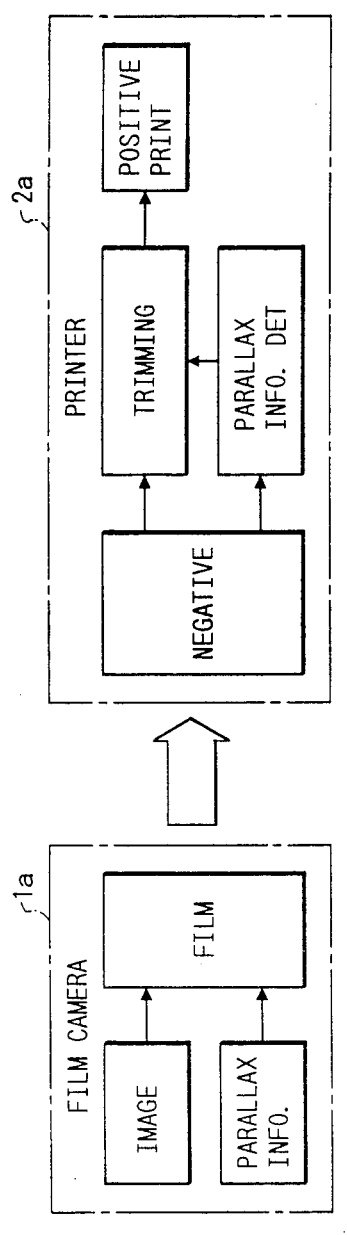
FIGS. 14 and 15 are schematic views showing system structures of the present invention employing a film still camera.

FIG. 14 shows the structure of a system for effecting the photographing with trimming by the camera 1a, utilizing the photographic film, of the foregoing embodiment and the printing with the printer 2a.

In the camera utilizing the silver-halide-based film, the image and the parallax information are recorded on the film when the trimming mode is set at the photographing operation, and the printed photographed is obtained by the trimming for parallax correction in the printing operation, by detecting the parallax information from the negative film.

Figure 15:
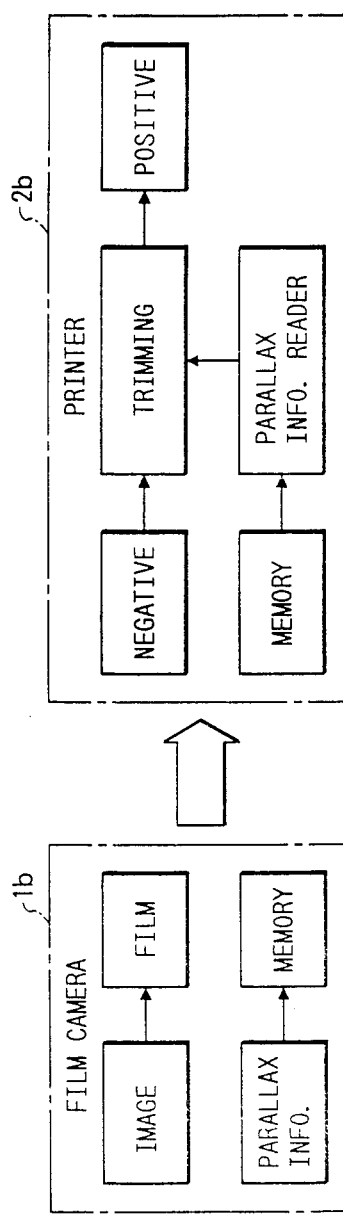

FIG. 15 shows another system structure of the present invention, which employs a camera utilizing a silver halide-based film as in the embodiment shown in FIG. 14, but the parallax information is recorded on a recording medium, such as a magnetic tape, provided on the film cartridge. In the film photographed in such camera 1b, the parallax information is read from said recording medium by setting said film cartridge at the printing operation on the printer 2b, and the photograph with parallax correction can be obtained with trimming according to said parallax information.

Figure 16:
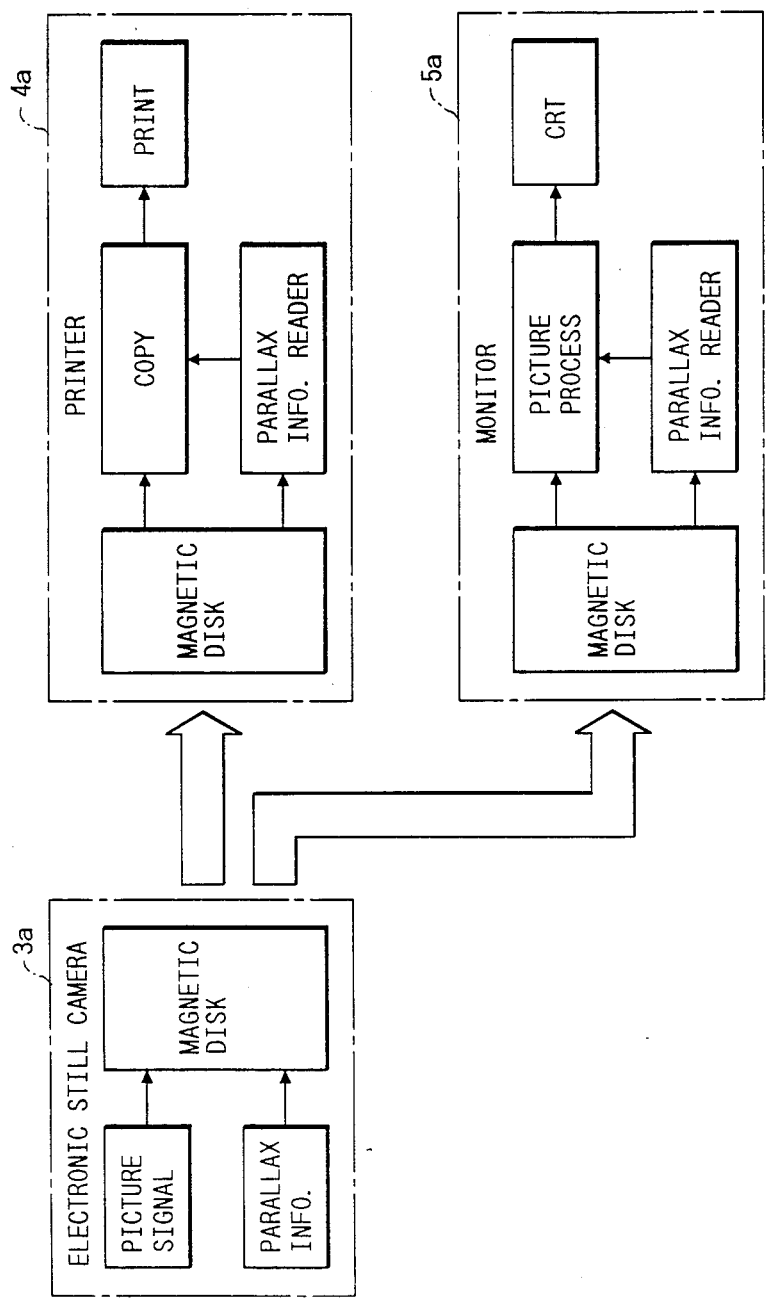
FIGS. 16 and 17 are schematic views showing system structures of the present invention employing an electronic still camera.

FIG. 16 shows another embodiment of the present invention employing an electronic still camera 3a, employing a solid-state image sensor such as a CCD. At the photographing operation, the parallax information is recorded, together with the image information, on a magnetic disk employed as the recording medium in the electronic still camera. AT the image reproduction with a printer 4a, the parallax information is read from said magnetic disk, and a print with parallax correction can be obtained by trimming at the printing of the image information. Also in the monitoring of the image recorded in the magnetic disk with a monitor 5a such as a cathode ray tube, the displayed image is trimmed according to the parallax information read from the magnetic disk.

Figure 17:
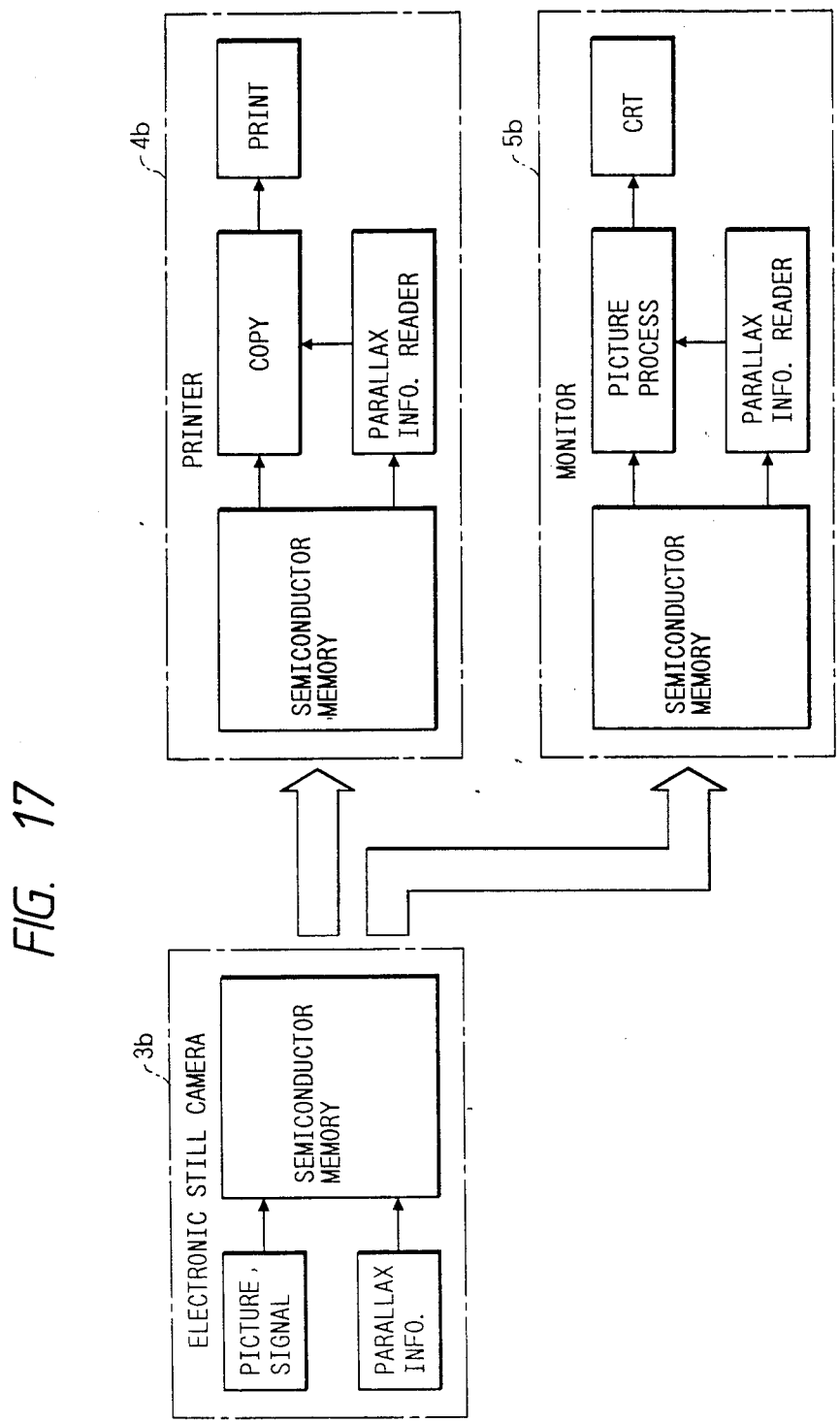
Figure 18:
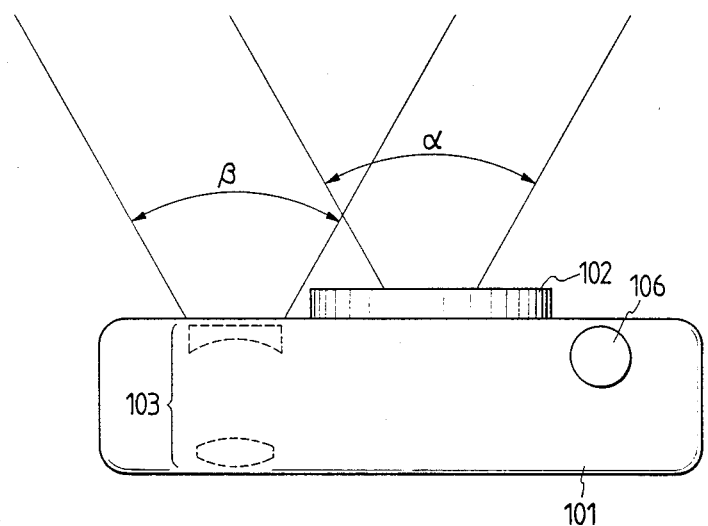
FIG. 18 is a plan view of a conventional camera.
Figure 19:
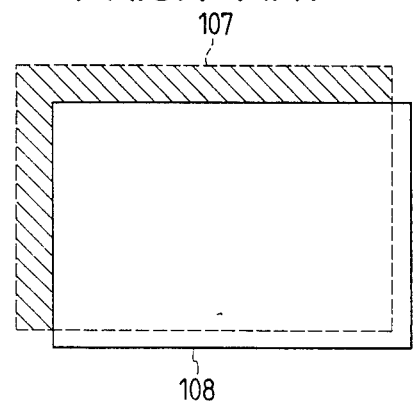
FIG. 19 is a schematic view showing the relationship between the view finder field and the actually photographed field on the film at a short object distance in a conventional camera.

FIG. 17 shows another system structure employing the same electronic still camera as in FIG. 16, but the recording medium is replaced by a semiconductor memory.

Also in the structure shown in FIG. 17, the parallax information is recorded, together with the image information, in the semiconductor memory at the photographing operation with the electronic still camera. At the printing with a printer 4b or at the monitoring with a monitor 5b, the copied or displayed image is trimmed according to the parallax information.

Also in the aforementioned camera utilizing the photographic film, the parallax information may be recorded, instead of optical recording outside the photographing area of the film, by punching outside the photographing area of said film. Furthermore the recording of parallax information may be achieved by applying ink, insolubilizing the film emulsion at the fixing step, in a position outside the photographing area of the film.

We claim:

1. A camera in which the optical axis of a photographing lens is positioned different from that of a view finder and to which detachably mounted is record means capable of recording therein an image to be photographed, comprising:
   (a) means for producing an object distance signal according to the object distance;
   (b) information producing means for producing parallax information corresponding to the difference between the photographing field of the photographing lens and the viewing field of the view finder, based on said object distance signal; and
   (c) writing means for recording said parallax information on said record means in response to said producing means.

2. A camera according to claim 1, wherein said information producing means comprises memory means stored therein parallax data, related to plural parallax information corresponding to different object distances; said information producing means is adapted to select a part of said parallax data stored in said memory means in response to said object distance signal; and said writing means is adapted to record, in said record means, said part of plural parallax data selected by said producing means.

3. A camera according to claim 2, wherein said camera comprises means for producing a focal distance signal according to the focal distance of the photographing lens, and said information producing means is adapted to select a part of said plural parallax data from said memory means, according to said object distance signal and said focal distance signal.

4. A camera according to claim 1, wherein said record means comprises a silver-halide-based photographic film; said camera comprises means for optically recording the image of an object on said photographic film; and said writing means is adapted to optically record said parallax information on said photographic film.

5. A camera according to claim 1, wherein said record means comprises a silver-halide-based photographic film and a memory unit; said camera comprises means for optically recording the image of an object on said photographic film; and said writing means is adapted to record said parallax information on said memory device.

6. A camera according to claim 1, wherein said record means comprises a magnetic disk; said camera comprises means for electrically recording the image of an object on said magnetic disk; and said writing means is adapted to electrically record said parallax information on said magnetic disk.

7. A system comprising:
   (a) a camera in which the optical axis of a photographing lens is positioned different from that of a view finder and to which detachably mounted is record means capable of recording therein an image to be photographed, comprising:
     means for producing an object distance signal according to the object distance;
     information producing means for producing parallax information corresponding to the difference between the photographing field of the photographing lens and the viewing field of the view finder, based on said object distance signal; and
     writing means for recording said parallax information on said record means in response to said producing means; and
   (b) a reproducing apparatus for reading said parallax information recorded in said record means and reproducing the image of the object recorded in said record means, based on thus read parallax information.

8. A system according to claim 7, wherein said reproducing apparatus comprises:
   reading means for reading said parallax information recorded in said record means;

trimming means for trimming the area of the image of the object recorded in said record means according to the viewing field of the view finder based on said parallax information thus read; and printing means for printing the area of image of the object subjected to said trimming.

9. A system according to claim 8, wherein said record means comprises a silver-halide-based photographic film and a memory device; said camera comprises means for optically recording the image of an object on said photographic film; and said writing means is adapted to record said parallax information in said memory device.

10. A system according to claim 7, wherein said reproducing apparatus comprises:

reading means for reading said parallax information recorded in said record means;

trimming means for trimming the area of the image of the object recorded in said record means according to the viewing field of the view finder based on said parallax information thus read; and visualizing means for visualizing the area of image of the object subject to said trimming.

* * * * *